(12) United States Patent
Dextraze

(10) Patent No.: US 10,299,528 B2
(45) Date of Patent: May 28, 2019

(54) ADJUSTABLE HEADGEAR MOUNT SYSTEM

(71) Applicant: Serge Dextraze, St-Jean-sur-Richelieu (CA)

(72) Inventor: Serge Dextraze, St-Jean-sur-Richelieu (CA)

(73) Assignee: CADEQUIP, INC., St-Jean-sur-Richelieu, Quebec (CA)

( * ) Notice: Subject to any disclaimer, the term of this patent is extended or adjusted under 35 U.S.C. 154(b) by 289 days.

(21) Appl. No.: 15/291,039

(22) Filed: Oct. 11, 2016

(65) Prior Publication Data

US 2018/0206577 A1 Jul. 26, 2018

Related U.S. Application Data

(63) Continuation-in-part of application No. 15/135,532, filed on Apr. 21, 2016, now abandoned.

(60) Provisional application No. 62/150,835, filed on Apr. 21, 2015.

(51) Int. Cl.
*A42B 3/04* (2006.01)
*F16M 13/04* (2006.01)

(52) U.S. Cl.
CPC ............... *A42B 3/042* (2013.01); *A42B 3/04* (2013.01); *F16M 13/04* (2013.01)

(58) Field of Classification Search
CPC ............ F41G 11/003; Y10T 403/7073; Y10T 403/7094

USPC .................. 224/181; 403/375, 381
See application file for complete search history.

(56) References Cited

U.S. PATENT DOCUMENTS

| | | | | | |
|---|---|---|---|---|---|
| 3,497,935 | A | * | 3/1970 | Bowling | B23B 27/04 407/108 |
| 5,031,492 | A | * | 7/1991 | Zinner | B23B 29/043 407/107 |
| 6,957,449 | B2 | * | 10/2005 | Prendergast | A42B 3/04 2/422 |
| 8,246,277 | B2 | * | 8/2012 | Hecht | B23B 27/04 407/85 |
| 2013/0312309 | A1 | * | 11/2013 | Rorick | F41G 11/003 42/114 |

* cited by examiner

*Primary Examiner* — Adam J Waggenspack
(74) *Attorney, Agent, or Firm* — FisherBroyles LLP; Anthony J DoVale; Rachel Huffstetler

(57) ABSTRACT

An adjustable headgear mount device and system is presented. The mount system comprises an adjustable jaw that is adjustable by the user to accommodate a various range of male dovetail parts. A dovetail adapter and the adjustable jaw define a female receiver cavity configured to engage a male dovetail protrusion therein. A user moves the adjustable jaw into a desired position relative to the dovetail adapter and securedly fixes the adjustable jaw in the desired position with at least one attachment screw. In the desired position, a portion of the device engages the male protrusion. The adjustable jaw can be moved to a different position by the user if a different size male dovetail part is desired to be attached to the headgear.

21 Claims, 7 Drawing Sheets

ADJUSTABLE HEADGEAR MOUNT SYSTEM

CROSS-REFERENCE TO RELATED PATENT APPLICATIONS

This application is a continuation-in-part application of copending U.S. patent application Ser. No. 15/135,532 filed on Apr. 21, 2016, which claims the benefit of U.S. Provisional Application No. 62/150,835, filed on Apr. 21, 2015 each of which applications are herein incorporated by reference in their entirety.

FIELD OF THE INVENTION

This invention relates generally to a mount for use with a headgear. More specifically, the invention relates to an adjustable mount system to mount various components to a headgear.

BACKGROUND OF THE INVENTION

The invention is particularly suited for use with night vision devices or other components for mounting on a headgear, such as a helmet and the like. For the purposes of discussion, we'll discuss night vision devices that are commonly used by military personnel for conducting operations in low light or night conditions. The night vision devices used by the military typically include image intensifier tubes and associated optics that convert infrared and near infrared light into viewable images.

Night vision mounting assemblies allow a user's hands to remain free while the user views a scene through the night vision device. Various assemblies for attaching night vision goggles to a night vision goggle headgear mount exist, including a goggle horn or bayonet assembly and a dovetail assembly.

Various manufacturers make each type of connector to mount their apparatuses thereon the top of a headgear. Accordingly, the size of each of the different manufacturers' design may not be exactly the same. As such, a dovetail male assembly of one manufacturer may not fit perfectly with a dovetail female assembly of another manufacturer. The same is true for the bayonet configuration. If there is not a snug, secure fit, the devices may rattle, jiggle, or fall off, which is a major issue.

What is needed in the art is a universal assembly that works with many, if not all, brands of mounts.

SUMMARY

Presented herein is an adjustable headgear mount device and system for securely and easily mounting dovetail devices of varying size to a headgear. A conventional dovetail device comprises a male protrusion. In one aspect, the mount system comprises a dovetail adapter and an adjustable jaw coupled to the dovetail adapter. A female receiver cavity can be defined by a portion of the dovetail adapter and the adjustable jaw, the cavity configured to receive at least a portion of the male protrusion of the dovetail device therein.

In another aspect, at least one attachment screw can securely attach the adjustable jaw to the dovetail adapter. At least a portion of the attachment screw can be positioned in an elongate slot defined in a portion of the dovetail adapter. Upon loosening of the attachment screw, the adjustable jaw can slide longitudinally relative to the dovetail adapter. That is, the adjustable jaw can slide longitudinally forward and rearward relative to the dovetail adapter to selectively increase or decrease the size of the female receiver cavity in order to accommodate dovetail devices of varying size.

In use, the adjustable jaw can be adjusted to a desired position in which the female receiver cavity is a predetermined size in order to accommodate a selected male dovetail protrusion. In the desired position, the male protrusion of the dovetail device can be inserted into the female receiver cavity of the mount system, and the male protrusion can engage a clipping lever of the mount system to securely attach the dovetail device to the mount system. Upon removal of the male protrusion from the female receiver cavity, the adjustable jaw can be adjusted as desired to increase or decrease the size of the female receiver cavity to securely engage a different sized male protrusion.

Related methods of operation are also provided. Other apparatuses, methods, systems, features, and advantages of the adjustable headgear mount system will be or become apparent to one with skill in the art upon examination of the following figures and detailed description. It is intended that all such additional apparatuses, methods, systems, features, and advantages be included within this description, be within the scope of the adjustable headgear mount system, and be protected by the accompanying claims.

DESCRIPTION OF THE FIGURES

The accompanying drawings, which are incorporated in and constitute a part of this specification, illustrate certain aspects of the instant invention and together with the description, serve to explain, without limitation, the principles of the invention. Like reference characters used therein indicate like parts throughout the several drawings.

DESCRIPTION OF THE INVENTION

Figure 1A:
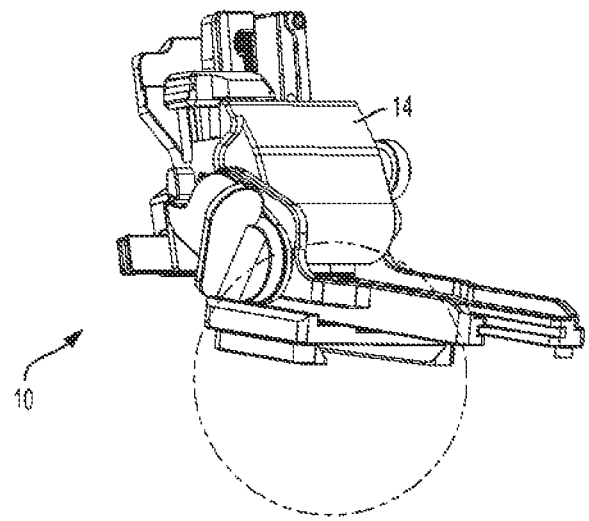
FIG. 1A is a perspective section view of one aspect of a headgear mount system having a dovetail connector, according to one aspect.
Figure 1B:
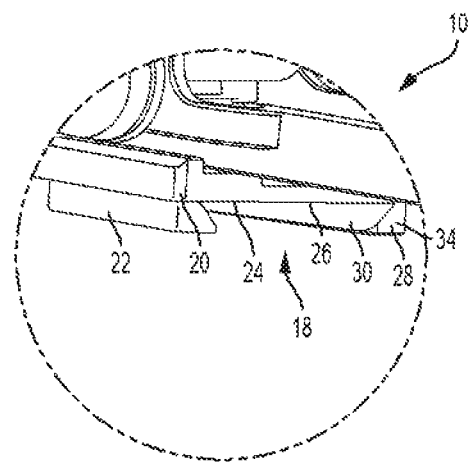
FIG. 1B is a magnified perspective section view of the headgear mount system of FIG. 1A.
Figure 2A:
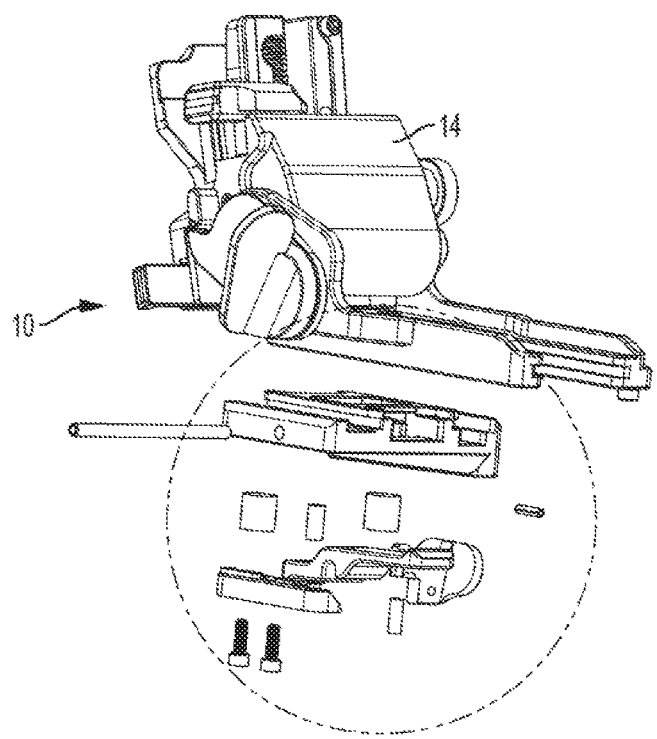
FIG. 2A is a partially exploded perspective section view of the headgear mount system of FIG. 1A.
Figure 2B:
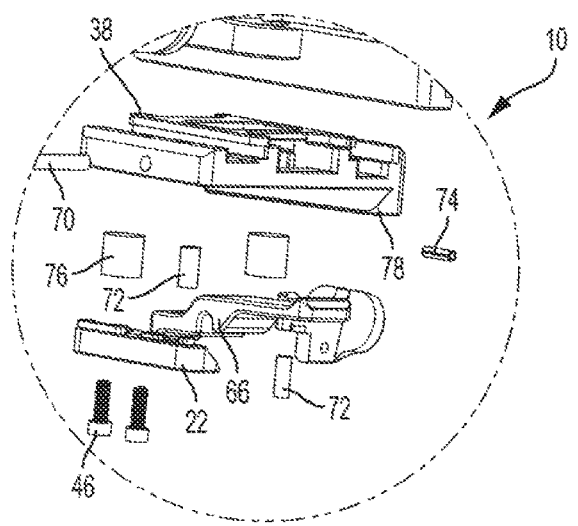
FIG. 2B is a magnified partially exploded perspective section view of the headgear mount system of FIG. 2A.

The present invention can be understood more readily by reference to the following detailed description, examples, and claims, and their previous and following description.

Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "mount" includes aspects having two or more mounts unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Terms used herein, such as "exemplary" or "exemplified," are not meant to show preference, but rather to explain that the aspect discussed thereafter is merely one example of the aspect presented.

Additionally, as used herein, relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Figure 7:
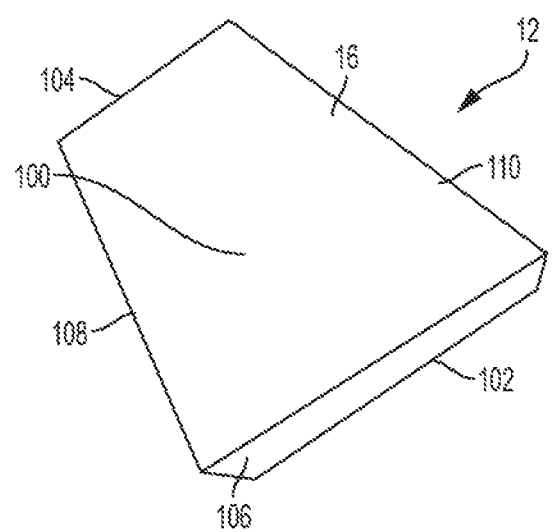
FIG. 7 is a perspective view of a male dovetail connector in accordance with various aspects of the helmet mount system of FIG. 1A.

In one aspect, presented herein is a headgear mount device and system 10 for attaching a device having a dovetail connector 12 to a headgear mount 14. Generally, dovetail connectors comprise a male protrusion 16 configured to securely attach to a female receiver. As illustrated in FIG. 7, conventional dovetail connectors 12 have a top face 100, an opposed bottom face 102, a leading edge 104, a trailing edge 106 that can have a length longer than the length of the leading edge, a first side edge 108 and a second opposed side edge 110. The first and second side edges can be angled inwardly from the trailing edge to the leading edge. Additionally, the first and second side edges can also be angled inwardly from the top face to the bottom face.

Referring now to FIGS. 1-6, in one aspect, the headgear mount system 10 defines a female receiver cavity 18 configured to receive at least a portion of the male protrusion 16 of the dovetail connector 12. The headgear mounting system can be an adapter device configured to be adjustable so that a variety of different sized dovetail connectors can be securely and easily attached to the headgear mount.

The headgear mount system 10 comprises a dovetail adapter 20 and an adjustable jaw 22 that cooperate to define the female receiver cavity 18. In one aspect, the jaw is selectively adjustable by a user to accommodate and/or engage a various range of sizes of male dovetail parts. For example, the position of the jaw 22 can be adjusted forward relative to the dovetail adapter in order to accommodate and/or engage a portion of a small dovetail connector 12. In another example, the position of the adjustable jaw can be adjusted rearward relative to the dovetail adapter 20 in order to accommodate and/or engage a portion of a large dovetail connector.

In one aspect, the female receiver cavity 18 can be defined by the dovetail adapter 20 and the adjustable jaw 22. As can be appreciated, a lower surface 24 of the dovetail adapter can form an upper surface 26 of the female receiver cavity 18. A fixed jaw 28 of the dovetail adapter can form a first surface 30 of the female receiver cavity, and the adjustable jaw can form a second surface 32 of the female receiver cavity. That is, the female receiver cavity can be defined primarily by two opposed longitudinal sides formed by the fixed jaw and the adjustable jaw. In a further aspect, the upper surface 26 can be tapered from a front surface 34 of the dovetail adapter 20 toward a rear surface 36 such that a cavity height decreases from the front surface of the dovetail adapter toward the rear. In still a further aspect, the headgear mount system 10 further comprises a mounting bracket 38. The mounting bracket can be configured to couple the headgear mount system to the headgear mount 14.

Figure 5:
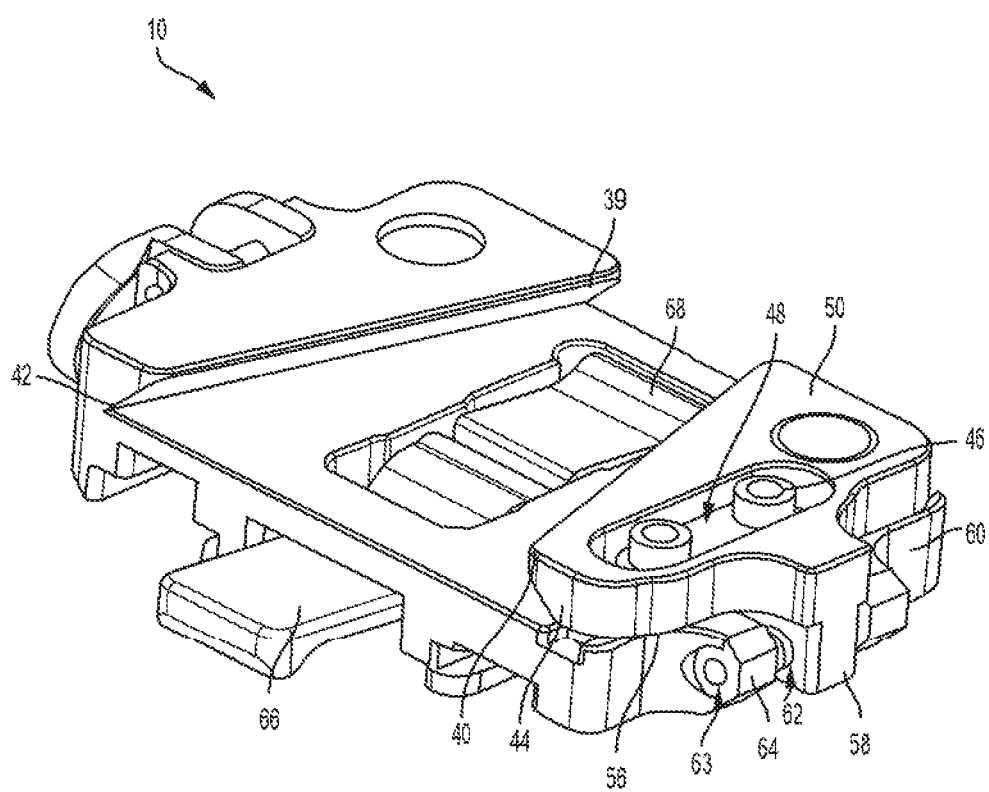
FIG. 5 is a lower perspective view one aspect of the headgear mount system of FIG. 1A.

In one aspect, the longitudinal sides of the dovetail adapter 20 (i.e., the first surface 30 and the second surface 32) can be angled from proximal to distal ends to conform to the shape of a male dovetail connector. For example, a lower portion 39 (or rearward as shown in FIG. 5) of the fixed jaw 28 and a lower portion of the adjustable jaw 22 can be closer to each other than an upper portion 40 of the respective jaws. That is, a first distance between the lower portion of the fixed jaw and the lower portion of the adjustable jaw can be less than a second distance between an upper portion 42 of the fixed jaw and an upper portion 44 of the adjustable jaw. In one aspect, the first distance and/or the second distance can be substantially constant from the front surface 34 of the dovetail adapter 20 toward the rear surface 36. Optionally, at least one of the first distance and/or the second distance can vary from the front surface of the dovetail adapter toward the rear surface.

Figure 3:
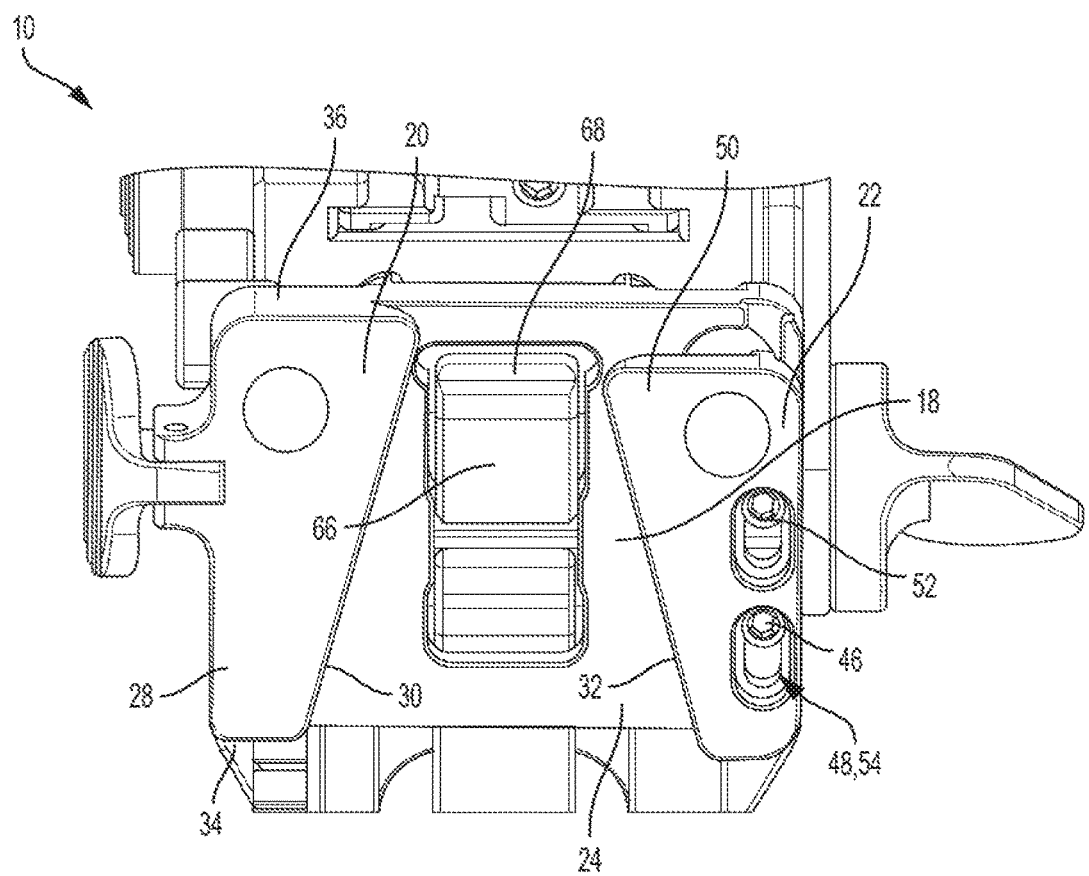
FIG. 3 is a lower perspective view of the headgear mount system of FIG. 1.

Referring now to FIGS. 3 and 5, the adjustable jaw 22 can be coupled to the dovetail adapter 20 with at least one attachment screw 46. In one aspect, the adjustable jaw can be positioned adjacent to a portion of the lower surface 24 of the dovetail adapter opposed to the fixed jaw 28. In another aspect, at least one slot 48 can be defined in a lower surface 50 of the adjustable jaw 22. In this aspect, the slot can be sized and shaped such that, when assembled, a head 52 of the attachment screw can be positioned in the slot 48. In another aspect, the slot can permit the adjustable jaw 22 to be selectively adjusted forward and/or rearward relative to the front surface 34 of the dovetail adapter 20 by a user. For example, the slot 48 can be a longitudinal slot sized and shaped to allow the adjustable jaw to slide longitudinally a predetermined distance when assembled. Similarly, the slot can be sized and shaped to restrict or prevent left-to-right and right-to-left movement of the adjustable jaw 22 relative to the dovetail adapter. In a further aspect, when assembled, a longitudinal axis of the slot 48 can extend in a direction substantially normal to the front surface 34 of the dovetail adapter 20. As illustrated in FIG. 3, in one aspect, the adjustable jaw 22 can define two slots 48, each configured for receipt of an attachment screw 46.

At least one aperture 54 can be defined in a lower surface 50 of the adjustable jaw 22. In one aspect, the aperture can extend from the lower surface through the slot 48 and to an upper surface 56 of the adjustable jaw. In this aspect, the aperture 54 can be sized and shaped such that the attachment screw 46 can pass through the aperture and to the dovetail adapter 20. That is, the attachment screw can extend through the slot 48 and the aperture to securely attach the adjustable jaw 22 to the dovetail adapter. In use and as described more fully below, the position of the adjustable jaw relative to the dovetail adapter 20 can be selected by a user before tightening the attachment screw to the dovetail adapter. As such, loosening of the attachment screw 46 can permit longitudinal movement of the adjustable jaw 22 relative to the headgear mount system 10. Similarly, tightening of the attachment screw 46 can prevent longitudinal movement of the adjustable jaw relative to the headgear mount system.

In one aspect, the adjustable jaw 22 can comprise a tab 58 extending away from the upper surface 56 of the adjustable jaw. The tab can be formed integrally with or coupled to the adjustable jaw 22 so that movement of the tab 58 can cause movement of the second surface 32 of the adjustable jaw. As illustrated in FIG. 5, the tab can be positioned adjacent to an outer surface 60 of the dovetail adapter 20. That is, when assembled as described more fully below, the tab 58 can overlie at least a portion of the outer surface of the dovetail adapter. In a further aspect, a threaded bore 62 can be defined in the tab such that the bore extends through the tab 58 in the longitudinal direction. That is, the bore can extend through the tab in a direction substantially parallel to the longitudinal axis of the at least one slot 48. In this aspect, the bore 62 can be threaded, sized and shaped to matingly engage an adjustment screw 64 of the dovetail adapter.

The adjustment screw 64 can be positioned in a threaded hole 63 defined in the dovetail adapter 20 adjacent to the outer surface 60 of the dovetail adapter, according to one aspect. In another aspect, the hole can be substantially parallel to the longitudinal axis of the slot 48 of the adjustable jaw 22 when the system 10 is assembled. In still another aspect, rotation of the adjustment screw 64 in the hole can cause the adjustment screw to move longitudinally in the hole.

Figure 4A:
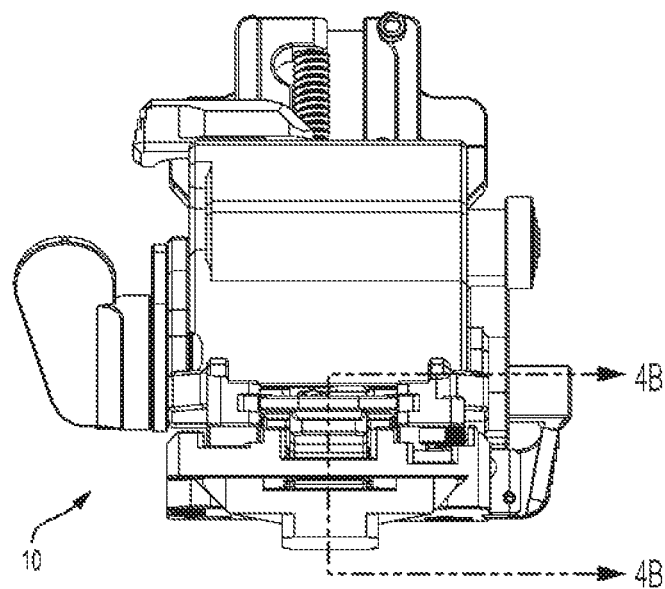
FIG. 4A is a front elevational view of the headgear mount system of FIG. 1.
Figure 4B:
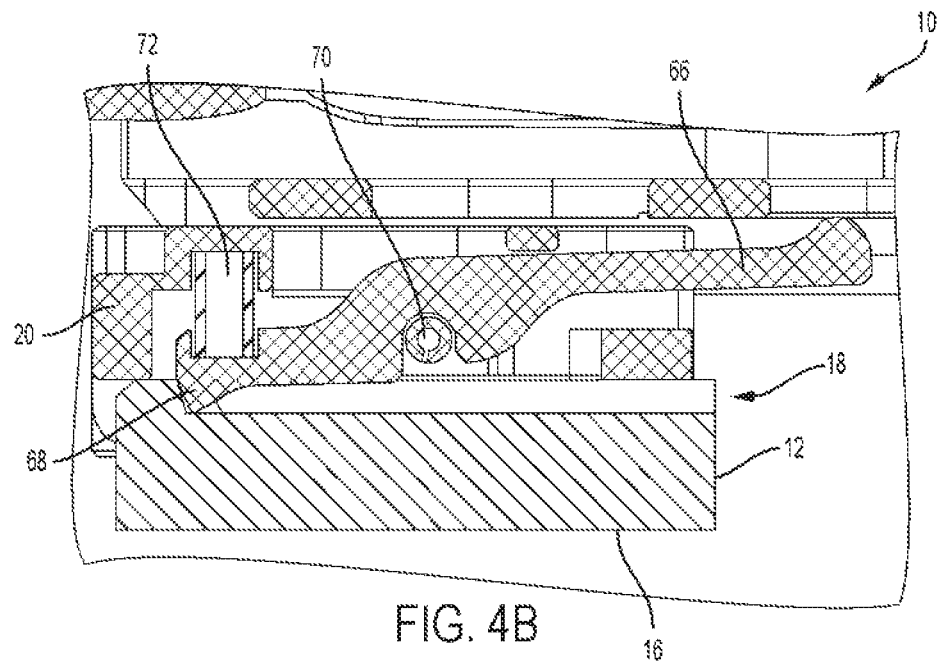
FIG. 4B is a cut away side elevational view of the headgear mount system of FIG. 4A taken along line 4B-4B of FIG. 4A.

In one aspect, the headgear mount system 10 further comprises a clipping lever 66 positioned in a portion of the female receiver cavity 18. The clipping lever can comprise a tooth 68 configured to engage a portion of the male protrusion 16 of dovetail connector 12, as illustrated in FIG. 4B. In another aspect, the clipping lever 66 can be coupled to a spring pin 70 such that the clipping lever can pivot around the spring pin. In a further aspect, the clipping lever 66 can comprise at least one spring 72 configured to bias the tooth into the female receiver cavity. For example, the tooth 68 can be urged into the female receiver cavity 18 and can matingly engage a portion of the male dovetail connector to secure the male dovetail connector to the mount system 10.

To assemble the headgear mount system 10, the adjustable jaw 22 can be positioned adjacent to a portion of the lower surface 24 and the outer surface 60 of the dovetail adapter 20. The adjustable jaw can be secured to the dovetail adapter with the at least one attachment screw 46; however, other forms of selective attachment are contemplated. The adjustment screw 64 of the dovetail adapter 20 can engage the threaded bore 62 of the tab 58 of the adjustable jaw 22. Further, the clipping lever 66 can be positioned in the female receiver cavity 18 so that at least a portion of the tooth 68 can extend into the female receiver cavity. In another aspect, the tooth can extend into the female receiver cavity 18 a predetermined distance from the lower surface 24 of the dovetail adapter 20. The predetermined distance can be selected, for example, to allow the tooth to engage the male protrusion 16 of the dovetail connector 12. In still a further aspect, the tooth 68 can have a tooth width sized so that when the tooth is engaged with the male dovetail connector, the tooth has a surface area sufficient enough to securely attach to the male protrusion of the dovetail connector 12. It is contemplated that the headgear mount system can be held together with conventional fasteners such as screws, dowel pins 74 and the like. In another aspect, at least one magnet 76 can be coupled to the mount system to automatically close portions of the system when not in use.

Figure 6A:
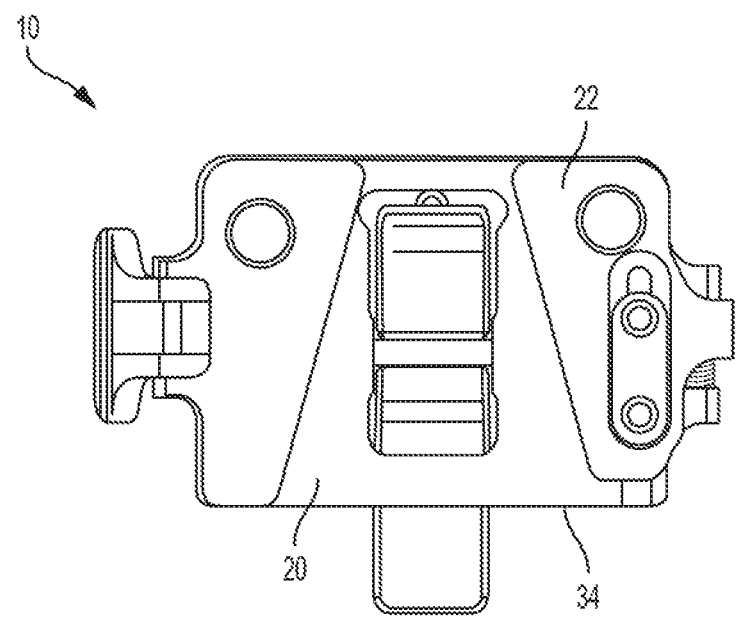
FIG. 6A is lower perspective view of the headgear mount system of FIG. 1A, showing an adjustable jaw in a first jaw position.
Figure 6B:
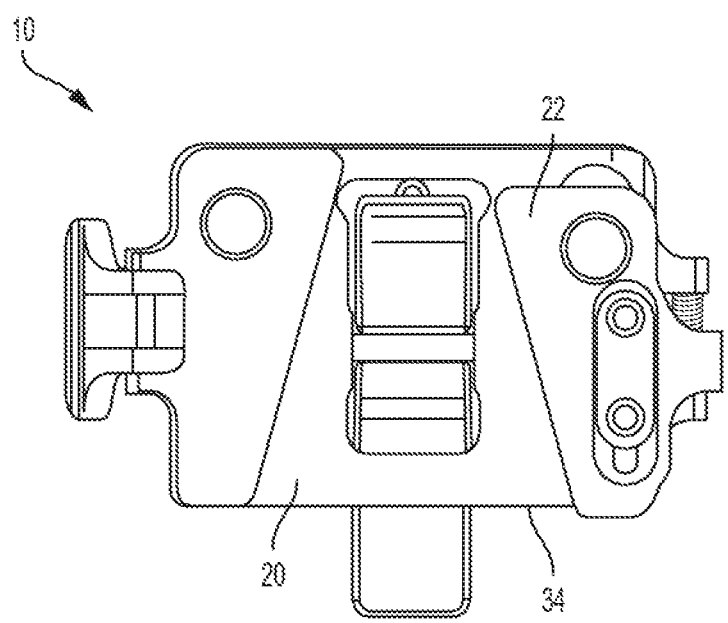
FIG. 6B is lower perspective view of the headgear mount system of FIG. 1A, showing the adjustable jaw in a second jaw position.

When assembled, the adjustable jaw 22 can slide relative to the dovetail adapter 20 a predetermined distance. For example, the adjustable jaw can slide about and between a first jaw position, in which the adjustable jaw 22 is a first distance from the front surface 34 of the dovetail adapter (as illustrated in FIG. 6A), and a second jaw position in which the adjustable jaw is a second distance from the front surface of the dovetail adapter that is less than the first distance (as illustrated in FIG. 6B). Optionally, in the second jaw position, a portion of the adjustable jaw 22 can overhang or extend beyond the front surface 34 of the dovetail adapter.

By varying the longitudinal position of the adjustable jaw 22, one can adjust the depth and width of the female receiver cavity 18 to accommodate differing sizes of male protrusion 16 of dovetail connectors 12. That is, in the first jaw position, the female receiver cavity has a first volume, and in the second jaw position, the female receiver cavity 18 has a second volume that is less than the first volume. Thus, the adjustable jaw 22 can slide longitudinally relative to the dovetail adapter 20 to vary the size of the female receiver cavity so that a dovetail connector can be securely attached to the headgear mount system 10 regardless of the size of the male protrusion 16 of the dovetail connector 12.

In use, the male dovetail protrusion 16 can be inserted into the female receiver cavity 18 of the headgear mount system 10, as shown in FIG. 4B. If the clipping lever 66 does not engage the male dovetail connector, the connection between the dovetail connector 12 and the headgear mount system can became loose. To avoid this situation, the adjustable jaw 22 can be adjustable forward and/or rearward by loosening the at least one attachment screw 46 and rotating the adjustment screw 64. Rotation of the adjustment screw in a first direction can move the adjustable jaw longitudinally forward relative to the front surface 34 of the dovetail adapter 20 and rotation of the adjustment screw 64 in a second direction can move the adjustable jaw 22 longitudinally rearward relative to the front surface of the dovetail adapter (i.e., about and between the first jaw position and the second jaw position). When the adjustable jaw is in a desired engaging position, the tooth 68 of the clipping lever 66 can engage the male dovetail connector 12. In this engaging position, the attachment screw 46 can be tightened to securely fix the position of the adjustable jaw 22 relative to the dovetail adapter 20.

With the adjustable jaw 22 in the desired, engaging position relative to the dovetail adapter 20, the male dovetail protrusion 16 can be inserted into the female receiver cavity 18 of the headgear mount system 10 and the tooth 68 of the clipping lever 66 can engage the male dovetail connector to securely attach the dovetail connector to the headgear mount system. Upon disengagement of the tooth of the clipping lever and removal of the dovetail connector from the headgear mount system, the position of the adjustable jaw can be adjusted, if desired, so that the headgear mount system 10 can accommodate a dovetail connector 12 having a different size.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described invention.

What is claimed is:

1. A headgear mount system for attaching a dovetail connector having a male protrusion to a headgear mount, the system comprising:
    a dovetail adapter having a fixed jaw; and
    an adjustable jaw coupled to the dovetail adapter, wherein the dovetail adapter and the adjustable jaw cooperate to define opposing side surfaces of a female receiver cavity having a lateral dimension defined by said side surfaces and having a longitudinal dimension extending substantially perpendicular to said lateral dimension and defined on one end by a dovetail adaptor front surface and configured to receive a portion of the male protrusion therein, wherein the adjustable jaw is adjustable about and between a first jaw position, in which the female receiver cavity has a first longitudinal and first lateral dimension, and a second jaw position, in which the female receiver cavity has a second longitudinal and a second lateral dimension that are each different from the respective first longitudinal dimension and first lateral dimensions.

2. The headgear mount system of claim 1, wherein the system further comprises a clipping lever, wherein a portion of the clipping lever is positioned in the female receiver cavity and configured to engage a portion of the male protrusion of the dovetail connector to securely attach the dovetail connector to the headgear mount.

3. The headgear mount system of claim 2, wherein the clipping lever comprises at least one spring configured to bias a portion of the clipping lever into the female receiver cavity.

4. The headgear mount system of claim 1, wherein at least one slot is defined in a lower surface of the adjustable jaw.

5. The headgear mount system of claim 4, wherein at least one aperture is defined in the lower surface of the adjustable jaw and extends from the lower surface through the at least one slot and to an upper surface of the adjustable jaw.

6. The headgear mount system of claim 5, wherein the at least one aperture is sized and shaped such that an attachment screw can pass through the aperture and to the dovetail adapter to securely attach the adjustable jaw to the dovetail adapter.

7. The headgear mount system of claim 4, wherein the adjustable jaw comprises a tab extending away from an upper surface of the adjustable jaw and wherein the tab is positioned adjacent to an outer surface of the dovetail adapter such that the tab overlies at least a portion of the outer surface of the dovetail adapter.

8. The headgear mount system of claim 7, wherein a threaded bore is defined in the tab, and wherein the bore extends in a direction substantially parallel to a longitudinal axis of the slot.

9. The headgear mount system of claim 8, wherein a longitudinal hole is defined in the dovetail adapter adjacent to the outer surface of the dovetail adapter.

10. The headgear mount system of claim 9, wherein the dovetail adapter further comprises an adjustment screw extending through at least a portion of the hole and through at least a portion of the threaded bore.

11. The headgear mount system of claim 10, wherein rotation of the adjustment screw in a first direction moves the adjustable jaw towards the first jaw position and rotation of the adjustment screw in a second direction moves the adjustable jaw towards the second jaw position.

12. A mounting adapter for attaching a dovetail connector having a male protrusion to a headgear mount, the adapter comprising:
    a dovetail adapter having a fixed jaw;
    an adjustable jaw coupled to the dovetail adapter, wherein the dovetail adapter and the adjustable jaw cooperate to define a female receiver cavity configured to receive a portion of the male protrusion therein, wherein the adjustable jaw is adjustable in a first direction about and between a first jaw position, in which the adjustable jaw is a first distance measured in the second direction from a front surface of the dovetail adapter and a second jaw position in which the adjustable jaw is a second distance measured in the second direction from the front surface of the dovetail adapter that is less than the first distance, the second direction being substantially perpendicular to the first direction.

13. A method for mounting a dovetail connector having a male protrusion to a headgear comprising:
    providing a mounting adapter comprising:
        a dovetail adapter having a fixed jaw; and
        an adjustable jaw coupled to the dovetail adapter, wherein the dovetail adapter and the adjustable jaw cooperate to define opposing side surfaces of a female receiver cavity having a lateral dimension defined by said side surfaces and having a longitudinal dimension extending substantially perpendicular to said lateral dimension and defined on one end by a dovetail adaptor front surface and configured to receive a portion of the male protrusion therein, wherein the adjustable jaw is adjustable about and between a first jaw position, in which the female receiver cavity has a first longitudinal and first lateral dimension, and a second jaw position, in which the female receiver cavity has a second longitudinal and a second lateral dimension that are each different from the respective first longitudinal dimension and first lateral dimensions; and
    adjusting the position of the adjustable jaw by moving the adjustable jaw relative to said dovetail adapter in a generally longitudinal direction to adjust the longitudinal and lateral dimensions of said female receiving cavity; and tightening at least one attachment screw to securedly fix the adjustable jaw to the dovetail adapter.

14. The headgear mount system of claim 1, wherein in said first jaw position the adjustable jaw is a first distance from said front surface of the dovetail adapter and in said second jaw position the adjustable jaw is a second distance from said front surface of the dovetail adapter that is less than the first distance.

15. The headgear mount system of claim 1, wherein said adjustable jaw defining the side surface of said female receiving cavity has a non-uniform width wherein the width adjacent a rear portion of said female receiving cavity is greater than the width adjacent the front surface of the female receiving cavity.

16. The headgear mount system of claim 15 wherein said adjustable jaw is tapered wherein the adjacent the rear portion of the female receiving cavity is greater than the width adjacent the front surface of the female receiving cavity.

17. The mounting adapter according to claim 12 further comprising a clipping lever, wherein a portion of the clipping lever is positioned in the female receiver cavity and configured to securely engage a portion of the male protrusion of the dovetail connector.

18. A headgear mount system for attaching a dovetail connector having a male protrusion to a headgear mount, the system comprising:

a dovetail adapter having a fixed jaw; and an adjustable jaw coupled to the dovetail adapter, wherein the dovetail adapter and the adjustable jaw cooperate to define a female receiver cavity configured to receive a portion of the male protrusion therein, wherein the adjustable jaw is adjustable about and between a first jaw position, in which the female receiver cavity has a first volume, and a second jaw position, in which the female receiver cavity has a second volume that is less than the first volume and wherein at least one slot is defined in a lower surface of the adjustable jaw, said adjustable jaw comprises a tab extending away from an upper surface of the adjustable jaw and wherein the tab is positioned adjacent to an outer surface of the dovetail adapter such that the tab overlies at least a portion of the outer surface of the dovetail adapter and wherein a threaded bore is defined in the tab, and wherein the bore extends in a direction substantially parallel to a longitudinal axis of the slot.

19. The headgear mount system of claim 18, wherein a longitudinal hole is defined in the dovetail adapter adjacent to the outer surface of the dovetail adapter.

20. The headgear mount system of claim 19, wherein the dovetail adapter further comprises an adjustment screw extending through at least a portion of the hole and through at least a portion of the threaded bore.

21. The headgear mount system of claim 20, wherein rotation of the adjustment screw in a first direction moves the adjustable jaw towards the first jaw position and rotation of the adjustment screw in a second direction moves the adjustable jaw towards the second jaw position.

* * * * *